United States Patent
Hack et al.

(10) Patent No.: US 10,918,897 B2
(45) Date of Patent: Feb. 16, 2021

(54) BURN TRAY FOR A BURNER FOR SIMULATED FLAMES IN FIRE SIMULATION SYSTEMS, BURNER AS WELL AS FIRE SIMULATION SYSTEM

(71) Applicant: Drager Safety AG & Co. KGaA, Lübeck (DE)

(72) Inventors: Hauke Hack, Mölln (DE); Rasmus Marten, Lübeck (DE)

(73) Assignee: Dräger Safety AG & Co. KGaA, Lübeck (DE)

( * ) Notice: Subject to any disclaimer, the term of this patent is extended or adjusted under 35 U.S.C. 154(b) by 343 days.

(21) Appl. No.: 16/108,816

(22) Filed: Aug. 22, 2018

(65) Prior Publication Data
US 2019/0060690 A1 Feb. 28, 2019

(30) Foreign Application Priority Data
Aug. 25, 2017 (DE) ............... 10 2017 008 009.7

(51) Int. Cl.
*G09B 19/00* (2006.01)
*A62C 99/00* (2010.01)
*G09B 9/00* (2006.01)

(52) U.S. Cl.
CPC ............ *A62C 99/0081* (2013.01); *G09B 9/00* (2013.01)

(58) Field of Classification Search
CPC .......... G09B 19/00; F24C 3/04; A62C 99/081
USPC ................. 434/226; 126/540, 541
See application file for complete search history.

(56) References Cited

U.S. PATENT DOCUMENTS

| | | | | |
|---|---|---|---|---|
| 5,374,191 A * | 12/1994 | Herman | ............. | A62C 99/0081 434/226 |
| 5,447,437 A * | 9/1995 | Joynt | ................. | A62C 99/0081 434/226 |
| 5,700,141 A * | 12/1997 | Miller | .................... | F23Q 3/006 431/125 |
| 5,888,072 A * | 3/1999 | Musto | ..................... | G09B 9/00 434/226 |
| 6,192,881 B1 * | 2/2001 | Nix | ....................... | F24B 1/1808 126/39 R |
| 6,802,718 B2 * | 10/2004 | Musto | .................... | G09B 19/00 434/219 |
| 6,866,513 B2 * | 3/2005 | Hough | .................... | G09B 9/00 434/226 |
| 7,744,373 B2 * | 6/2010 | Williamson | ....... | A62C 99/0081 434/226 |
| 8,192,202 B2 * | 6/2012 | Schutte | .................. | G09B 19/00 434/226 |
| 9,707,424 B2 * | 7/2017 | Bloemker | ................ | G09B 9/00 |

FOREIGN PATENT DOCUMENTS

DE 10 2004 058 190 A1 6/2006

* cited by examiner

*Primary Examiner* — Kurt Fernstrom
(74) *Attorney, Agent, or Firm* — McGlew and Tuttle, P.C.

(57) ABSTRACT

A burn tray (10) for a burner (1) simulates flames in fire simulation systems. The burn tray (10) has a pressurized chamber (20) with a tray (21) and with a cover element (22). The tray (21) and the cover element (22) are arranged fixed to one another with the formation of at least one gap (30). At least one comb plate (40) is arranged in the at least one gap (30). The comb plate (40) has webs (41) and free spaces (42). The present invention further pertains to a burner (1) for simulated flames in fire simulation systems as well as a fire simulation system.

20 Claims, 9 Drawing Sheets

BURN TRAY FOR A BURNER FOR SIMULATED FLAMES IN FIRE SIMULATION SYSTEMS, BURNER AS WELL AS FIRE SIMULATION SYSTEM

CROSS REFERENCE TO RELATED APPLICATIONS

This application claims the benefit of priority under 35 U.S.C. § 119 of German Application 10 2017 008 009.7, filed Aug. 25, 2017, the entire contents of which are incorporated herein by reference.

TECHNICAL FIELD

The present invention pertains to a burn tray for a burner for simulated flames in fire simulation systems. Further, the present invention pertains to a burner for simulated flames in fire simulation systems as well as a fire simulation system.

BACKGROUND

Burners for simulated flames are used in fire simulation systems, especially according to the dry burner technology. Fire simulation systems can be mobile or stationary. Such burners are characterized by a high mobility with simultaneous robustness and can be operated with gaseous media, for example, with liquid gas. The burners for simulated flames in fire simulation systems have a very simple construction and have an optimal geometry in terms of the fluidic properties and flow openings that can be adapted in a simple manner for the discharge of the gaseous medium.

Fire simulation systems are used both for the instruction and training of rescue teams and within the scope of instructing employees and private individuals. Fire simulation systems are characterized by a reproducible safety in the case of continuous operation. In particular, mobile fire simulation systems are used for the instruction in the handling of different types of fire extinguishers.

Figure 1:
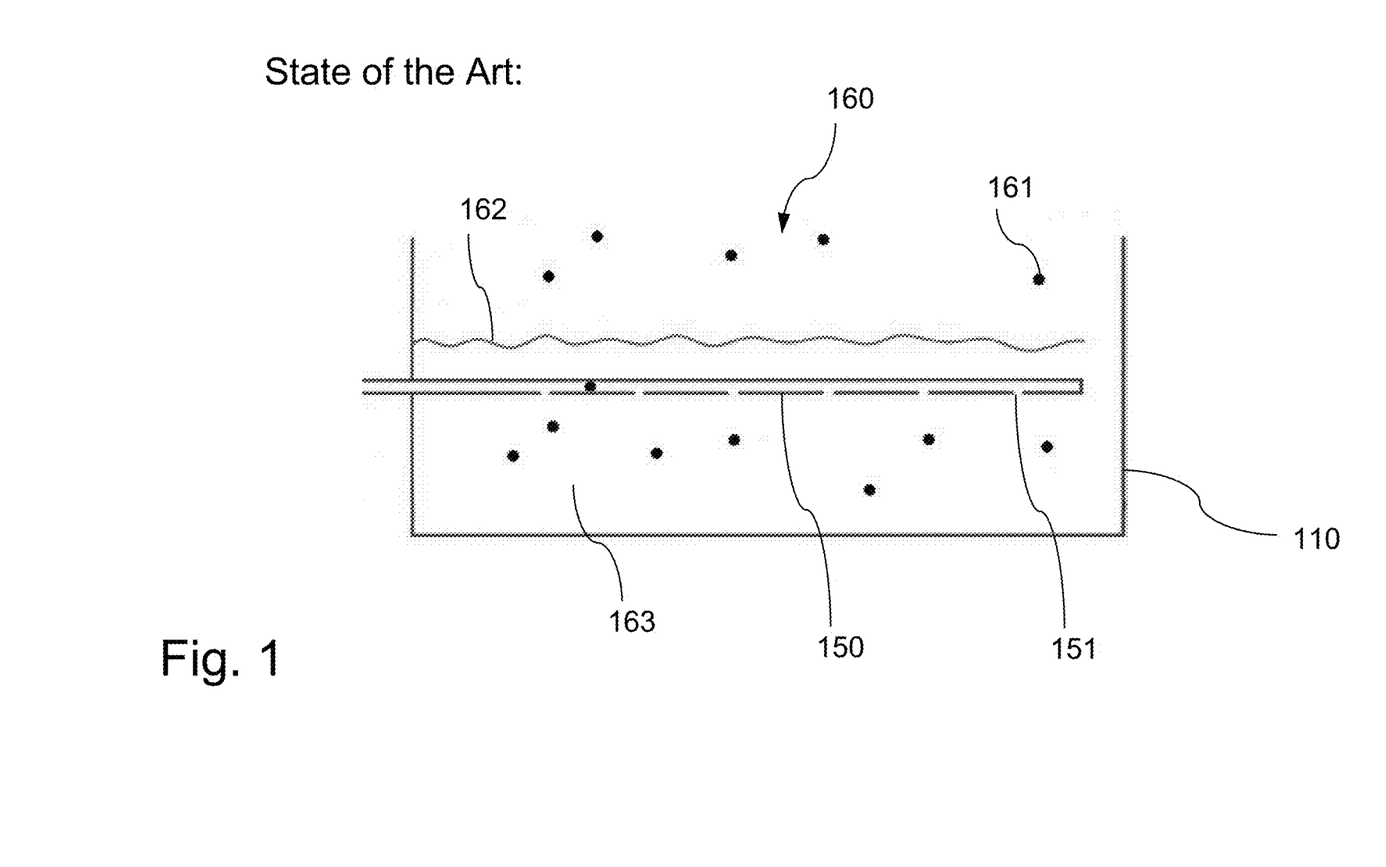
FIG. 1 is a schematic sectional view through the burn tray of a burner according to the state of the art.

FIG. 1 shows a principle of function of a prior-art fire simulation system with a burner tray 110. The combustible gas is led with overpressure to the fire site via a pipeline provided with holes 151. The gas molecules 161 are released from the holes 151 in a water bath located in a burn tray 110 and rise up in a disorganized manner. Above the water line 162 of water 163 an ignitable mixture 160 is formed with the surrounding oxygen of the atmosphere, which is ignited via an igniter. The combustible gas burns with a heat output equivalent to the quantity of gas fed in.

The drawback of such a fire simulation system is that the water bath is absolutely necessary for the normal operation of the fire site, so that the burn tray has to be filled with water before each startup. The burn tray must therefore have a watertight construction and additionally be capable of releasing the water. This leads to marked limitations for mobile applications of the fire simulation system. Further, operation of the fire simulation system is not possible at low temperatures because of the water bath. Icing up may occur in this case.

Figure 2:
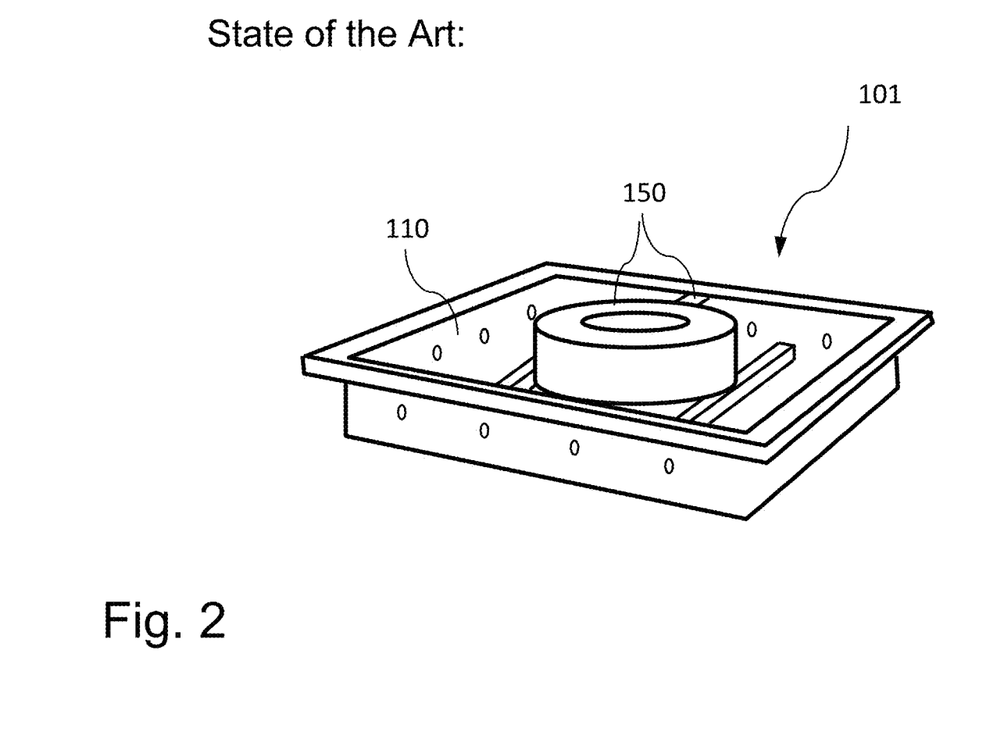
FIG. 2 is a schematic perspective view of a burner with a burn tray according to the state of the art.

FIG. 2 schematically shows another prior-art burner 101 with a burn tray 110.

The combustible gas is fed into the burn tray 110 via a feed line 150 and is thereupon distributed by gas distribution webs in the area of the burn tray 110. The combustible gas is released downwards into the burn tray 110, deflects off the bottom plate of the burn tray and then rises up. Oxygen is fed through the slots in side plates of the burn tray, so that an ignitable mixture forms and can be ignited in the interior of the burn tray 110.

This prior-art burner of a fire simulation system has drawbacks as well. The burn tray is in direct contact with the flame due to the ignition of the mixture of combustible gas and oxygen within the burn tray. This causes a high heat input with corresponding heating of the burn tray and the burner. The burn tray or the burner must therefore have a correspondingly massive configuration in order to guarantee a long life. Thus, for example, burners with dimensions of 16×68×75 cm have, as a rule, a weight of more than 20 kg. A further drawback is that warping of the plates of the burn tray may occur in case of simultaneous extinguishing, i.e., rapid cooling off of the burner and the burn tray. The high input of heat into the system causes a prolonged cooling off phase upon completion of the training scenario or during retrofitting, i.e., of the burn tray and of the burner.

SUMMARY OF THE INVENTION

An object of the present invention is to at least partially eliminate the above-described drawbacks in burners and burn trays for a burner for simulated flames in fire simulation systems. In particular, an object of the present invention is to provide a burn tray for a burner for simulated flames in fire simulation systems, a burner for simulated flames in fire simulation systems as well as a fire simulation system, which withstand limitations due to temperature effects and which have a high mobility.

The above object is accomplished by a burn tray for a burner for simulated flames in fire simulation systems with features according to the invention as well as by a burner for simulated flames in fire simulation systems with features according to the invention as well as by a fire simulation system with features according to the invention. Further features and details of the present invention appear from the specification and the drawings. In this connection, the features and details, which are described in connection with the burn tray according to the present invention, of course, also apply in connection with the burner according to the present invention as well as the fire simulation system according to the present invention and vice versa, so that reference will and can always be made mutually to the individual aspects of the present invention with regard to the disclosure.

According to a first aspect of the present invention, the object is accomplished by a burn tray for a burner for simulated flames in fire simulation systems, having a pressurized chamber with a tray and with a cover element, wherein the tray and the cover element are arranged fixed to one another with the formation of at least one gap, and having at least one comb plate which is arranged in the at least one gap, wherein the comb plate has webs and free spaces. A burn tray with such a configuration can be operated without a water bath, so that the limitations due to temperature effects develop only to a minimal extent. Furthermore, a high mobility of the burn tray and thus of the burner, in which such a burn tray is used, is guaranteed. Due to its special configuration, the burn tray prevents the input of heat that is due to contact with flames into the entire construction, so that the burn tray may have a lightweight configuration and at the same time can react to the temperature fluctuation occurring due to extinguishing in an extremely robust manner.

The pressurized chamber is enclosed by the tray and the cover element. The pressurized chamber especially forms a closed system, which has openings only in the area of the gaps or the free spaces, through which gaseous medium can be released from the pressurized chamber, i.e., only in the area of the at least one gap can gaseous medium, which is introduced into the pressurized chamber via a feed line, flow out from the pressurized chamber for formation of an ignitable mixture. So that the gaseous medium can flow out of the at least one gap in a defined manner, a comb plate is arranged, especially fixed, in the at least one gap. The comb plate has webs and free spaces between the respective webs, so that a defined outflow of the gaseous medium can take place through the free spaces of the comb plate. The size of the webs and thus of the free spaces can be varied during the manufacture of the comb plate, so that depending on the desired burning scenario, a defined outflow of gaseous medium from the pressurized chamber of the burn tray can be achieved. The pressurized chamber is used for the optimal distribution of the gaseous medium, i.e., the combustible gas, flowing into the pressurized chamber. The pressurized chamber is configured as a so-called intermediate pressurized chamber, since it does not have to withstand very high pressures.

The pressurized chamber of the burn tray is configured such that after feeding the gaseous medium into the pressurized chamber, the oxygen present in it is displaced from the pressurized chamber within a short time, so that no ignition can take place within the pressurized chamber of the burn tray. Due to the defined sizes of the webs and the free spaces of the at least one comb plate, the gaseous medium can be released into the atmosphere in a defined manner, where an ignitable mixture is formed with the surrounding oxygen. Due to the geometry of the comb plate, especially the size and shape of the webs and free spaces of the comb plate, an optimal flame image can be generated for the respective burning scenario. The high outflow rate of the gas at the nozzle geometry prevents the ignition of the mixture from taking place directly at the outflow edge between the tray and the cover element, i.e., the flame forms because of the comb plate at a certain distance from the burn tray, so that no direct contact of the burn tray with the flame occurs and the input of heat into the entire construction only takes place in the form of the radiation heat of the flame. If liquid gas is used as the gaseous medium, then the liquid gas expands when flowing into the pressurized chamber, which ensures an additional cooling of the pressurized chamber.

According to a variant of the present invention, provisions may be made in a burn tray for the comb plate to be fastened to the pressurized chamber, especially to the tray and/or to the cover element. For example, the comb plate can be detachably fastened to the pressurized chamber. The fastening may be carried out by means of clamping elements or snap-in elements. However, a burn tray, in which the comb plate is welded to the pressurized chamber, especially to the tray and/or to the cover element, is especially preferred. As a result of this, it is ensured that the comb plate can not be detached from the burn tray and thereby a permanently reproducible flame image can be guaranteed.

The burn tray, i.e., the tray, the cover element and also the comb plate, is preferably made of stable sheet metal.

According to another preferred variant of the present invention, provisions may be made in a burn tray for the tray to have a bottom and baffle plates which are arranged bent at an angle each on both longitudinal sides of the bottom. The gaseous medium flowing into the pressurized chamber can be deflected by the baffle plate, which leads to a uniform distribution of the gaseous medium in the pressurized chamber. Both the bottom and the baffle plates are preferably formed from flat sheet metal. The tray may have a one-piece, especially monolothic, configuration. However, the baffle plates may be welded to the bottom on the longitudinal sides thereof. The tray preferably has a trapezoidal cross section, i.e., the tray especially preferably has the shape of a cake pan expanding upwards. So that the pressurized chamber has a sealed configuration, a cover element, which preferably runs parallel to the bottom of the tray, is arranged on the top side of the tray, in a sealing manner at the tray. Gaseous medium flowing into the pressurized chamber can again flow out of the pressurized chamber only in the area of the at least one gap. Due to the comb plate arranged in the at least one gap, this outflow may take place in a targeted manner. Preferred is a burn tray, in which the cover element has a cover bottom and side walls arranged bent at an angle each on both longitudinal sides of the cover bottom. The slope of the side walls to the cover bottom preferably corresponds to the slope of the baffle plates of the tray to the bottom of the tray. As a result of this, it is guaranteed that when the cover element is fastened to the tray, the side walls of the cover element run parallel to the respective baffle plates of the tray with the formation of at least one gap. The distance of the side walls of the cover element to the baffle walls (baffle plates) of the tray is defined in a precise manner and corresponds to the thickness or somewhat more than the thickness of a comb plate, so that this comb plate can be introduced into the gap for producing a special outflow geometry.

Further, a burn tray, in which the webs and/or free spaces of the comb plate have different widths, is preferred. As a result, a defined outflow of the gaseous medium from the pressurized chamber can be achieved, which in turn leads to a specific flame image above the burn tray.

According to another variant of the present invention, provisions may be made in a burn tray for a gas-carrying pipeline, which has holes for the passage of a gaseous medium flowing through the gas-carrying pipeline, to be arranged in the pressurized chamber, i.e., the gas-carrying pipeline is preferably arranged in a fixed manner within the pressurized chamber. Ideally, the gas-carrying pipeline is fastened, especially welded, to the bottom of the tray of the pressurized chamber, so that a defined distance remains present between the gas-carrying pipeline and the cover element. It is also advantageously possible that the gas-carrying pipeline is arranged such that gaps are formed between the cover element and the tray. The holes are then preferably also to be arranged vertically downwards in the direction of the tray in order to achieve a further deflection of the combustible gas and thus a uniform distribution. In the latter case, the pipe is fastened via side parts, which are also used for mounting the burner. The holes are preferably provided distributed uniformly over the gas-carrying pipeline in the wall of the pipeline. The gaseous medium is caused to flow into the pipeline via a feed line and is as a result transported into the burn tray. The gaseous medium flows out from the pipeline into the intermediate pressurized chamber through the holes of the pipeline at a very high velocity. The gaseous medium flowing out from the holes is deflected in the pressurized chamber through the baffle plates of the tray as well as the bottom side of the cover bottom of the cover element, which leads to a uniform distribution of the gaseous medium in the pressurized chamber. The residual oxygen present in the pressurized chamber is displaced within the pressurized chamber by the gaseous medium flowing in within a short time, so that no ignition can take place within the pressurized chamber. The holes may have different types of geometries. The holes preferably have a circular configuration. However, the holes may have the shape of longitudinal slots or the like as well.

Provisions may be made in a preferred burn tray for outflow edges to be formed at the side walls of the cover element in connection with the baffle plates of the tray and the free spaces of the comb plates for the defined outflow of the gaseous medium from the pressurized chamber. The at least one comb plate preferably lines up precisely with the pressurized chamber, especially with the side walls of the cover element and the baffle plates of the tray. As a result of this, outflow edges or outflow nozzles are formed, which ensure a directed, defined outflow of the gaseous medium from the pressurized chamber. As a result of this, it can be guaranteed that an ignition of the developing mixture of gaseous medium and oxygen from the atmosphere first takes place at a defined distance from the outflow edge, above the burn tray.

Further, according to a preferred further development of the present invention, provisions may be made in a burn tray for a gas flow control means for causing a dimension (the diameter) of the gas-carrying pipeline to be variable (such as the dimensions of the openings), and especially by means of slides, i.e., the flow quantity through the holes as well as the rate of flow through the holes can be varied. For this, for example, slides, which may especially have the shape of a second pipe arranged about the pipeline, may be provided. Due to a shifting of this second pipe toward the axis of the pipeline in an axially parallel manner, the holes may more or less be covered, so that the outflow quantity as well as the rate of outflow of the gaseous medium can be affected by the holes.

According to a second aspect of the present invention, the object is accomplished by a burner for simulated flames in fire simulation systems, having at least one burn tray according to the first aspect of the present invention, as well as at least one feed line for the feed of gaseous media into the pressurized chamber and/or into the gas-carrying pipeline of the burn tray. A burner having such a configuration has the same advantages as they have already been explained in detail with regard to a burn tray according to the first aspect of the present invention. Such a burner has a high mobility. Due to the operation of the burner without water bath, the weight of the burner is reduced, on the one hand, and, on the other hand, there is a reduction in limitations developing due to the effects of temperature. The burner may have a relatively lightweight configuration, since the input of heat in the direction of the fire chamber of the burner can be kept low due to the targeted outflow of the gaseous medium and the thus associated formation of the flames. Nevertheless, the burner, especially the fire chamber, has a certain robustness in order not to react to the temperature fluctuation occurring due to extinguishing.

The outflow edges and the comb plates of the burn tray ensure that flames form first at a certain distance from the burner, i.e., from the outflow edge of the burn tray, so that there is no direct contact with the flame and the input of heat into the fire chamber or into the burner only takes place in the form of radiation heat of the flame. If liquid gas is used as the gaseous medium in the burner, then an additional cooling of the intermediate pressurized chamber may take place because of the expansion of the liquid gas during the outflow into the intermediate pressurized chamber.

According to a preferred variant of the present invention, provisions may be made in a burner for this burner to have a burner frame for accommodating the at least one burn tray. A burner may, of course, have two or more burn trays. The burner may preferably have an ignition device, which is used for igniting the developing mixture of outflowing gaseous medium and atmospheric oxygen.

According to a third aspect of the present invention, the object is accomplished by a fire simulation system, especially according to dry burner technology, with a burner according to the second aspect of the present invention. The fire simulation system has a supply tank for gaseous medium. The fire simulation system may have a stationary or mobile configuration. Correspondingly, the fire simulation system has the same advantages as they have already been explained in detail with regard to the burn tray according to the first aspect of the present invention and with regard to the burner according to the second aspect of the present invention.

Provisions may preferably be made in a fire simulation system for a plurality of burners, and thus burn trays, to be arranged next to each other at a defined distance from one another. In particular, the burners and burn trays of the burners are arranged next to each other such that a uniformly load-bearing structure, similar to a grid, is formed due to the baffle plate of the trays and the side walls of the cover elements. This load-bearing structure has the advantage that it is both walkable, i.e., by rescue teams, and drivable, especially by means of fire trucks. A large-area fire simulation system may be formed due to a defined arrangement of a plurality of burners next to each other. Thus, burners can be arranged next to each other in a row. Further, a plurality of rows of burners may be arranged parallel to one another. Due to a defined distance of adjacent burners or burn trays next to each other, the free edges of the baffle plates of the trays and the side walls of the cover elements form a grid-like, flush-integrated surface, which is walkable and/or drivable. The baffle plates of the trays and the side walls of the cover elements preferably have such a thickness as to bear high loads, such as vehicles. For example, the combination of a baffle plate of a tray and a side wall of the cover element may together have a sheet metal thickness of 5 mm to 10 mm, preferably between 7 mm and 10 mm. As a result of this, the burn trays of the individual burners have a sufficiently high stability to bear high loads in connection with other burners. For example, a baffle plate of a tray may have a thickness of 5 mm and a side wall of a cover element may have a thickness of 2 mm.

Further actions improving the present invention appear from the following description of different exemplary embodiments of the present invention, which are shown schematically in the figures. All features and/or advantages, including design details and arrangements in space, appearing from the claims, the specification or the drawings may be essential to the present invention both by themselves and in the various combinations. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Referring to the drawings, components with identical function and mode of action are each provided with the same reference numbers in FIGS. 3 through 9.

FIGS. 1 and 2 are acknowledged in the introduction to the specification as state of the art for burn trays for burners for simulated flames in fire simulation systems.

Figure 3:
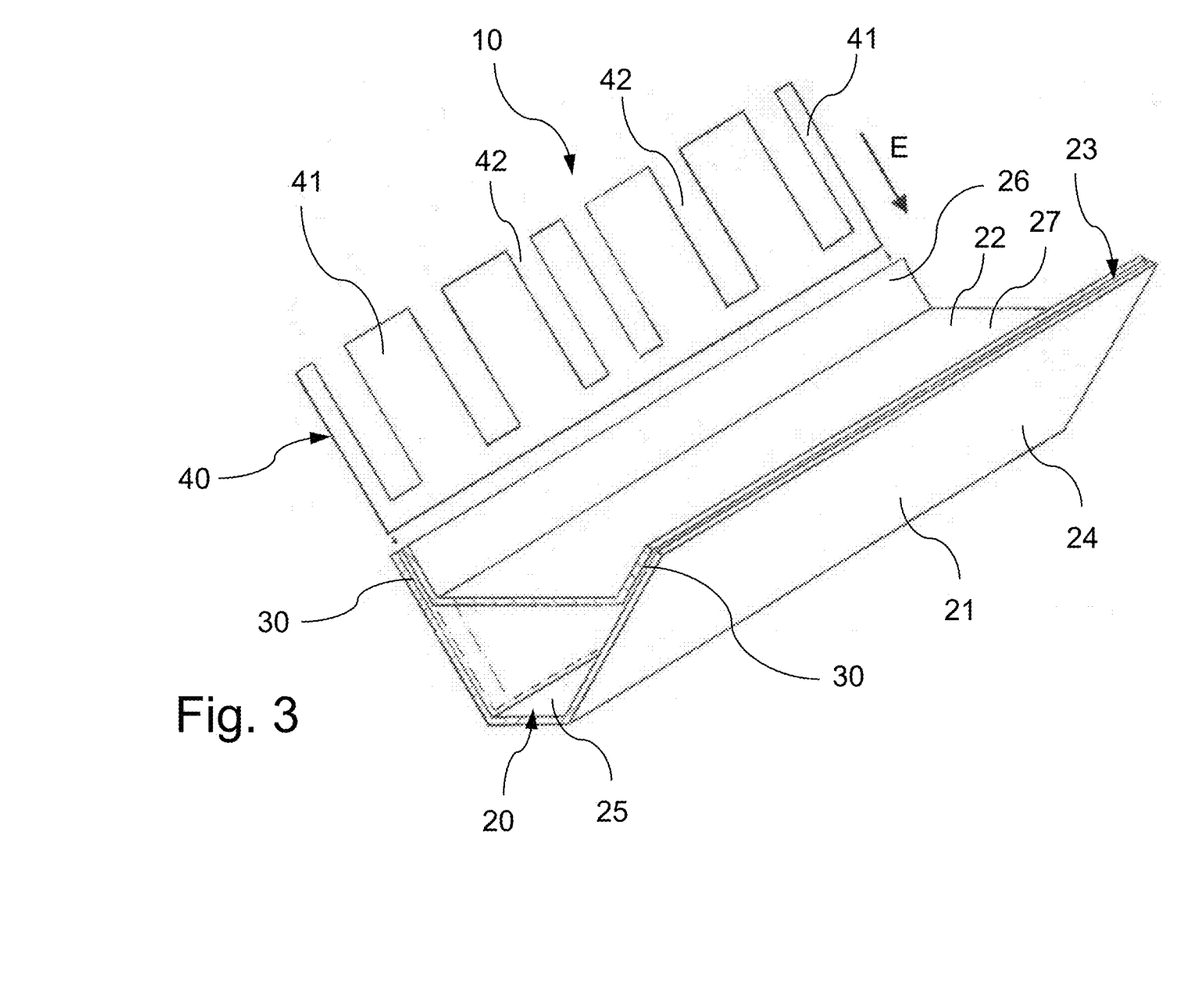
FIG. 3 is a schematic perspective view of a burn tray according to the present invention shown during the mounting of the comb plate onto the pressurized chamber of the burn tray.
Figure 4:
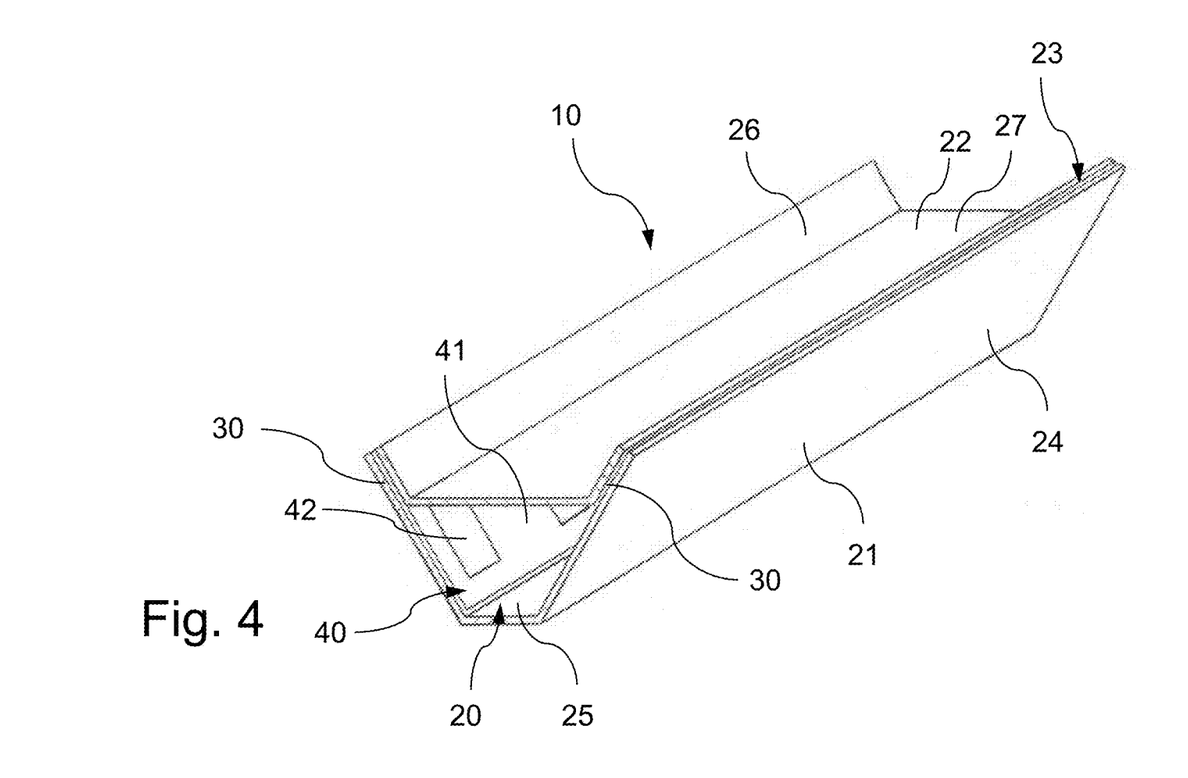
FIG. 4 is a schematic perspective view of the burn tray shown in FIG. 3 in the assembled state.

FIG. 3 shows a burn tray 10 for a burner 1 for simulated flames in fire simulation systems in a perspective view. The burn tray 10 has a pressurized chamber 20 with a tray 21 and with a cover element 22. The tray 21 and the cover element 22 are arranged fixed to one another with the formation of two gaps 30, i.e., a gap 30 each, through which gaseous medium can flow from the pressurized chamber 20 into the atmosphere, is present between the respective side walls 26 of the cover element 22 and the baffle plates 24 of the tray 21. So that the outflow of the gaseous medium from the pressurized chamber 20 can take place in a targeted manner, the burn tray 10 has two comb plates 40, only one of which is shown in FIG. 3. Each comb plate 40 has a thickness that corresponds to the gap 30, so that the comb plate 40 can be inserted in a precisely fitting, especially sealing, manner into the gap 30 of the pressurized chamber 20. The insertion direction E of the comb plate is shown by an arrow. Each comb plate 40 has webs 41 and free spaces 42 between the webs 41. The webs 41 and free spaces 42 may have the same size. Of course, these may, however, also have different sizes among each other and/or relative to each other. The height of the free spaces 42 is preferably measured such that after the insertion of the comb plate 40 into a gap 30 of the pressurized chamber 20, some of the free spaces 42 protrude into the pressurized chamber 20, so that gaseous medium located in the pressurized chamber 20 can flow through the free spaces 42 from the gaps 30 into the surrounding area. Such a burn tray 10 has the advantage that no water bath is needed for the formation of a flame. Due to the special configuration of the burn tray 10, the gaseous medium flowing out from the pressurized chamber 20 flows in a targeted manner through the free spaces 42 and on the outflow side 23 from the respective gaps 30 and free spaces 42. As a result, the ignition of the mixture of the outflowing gaseous medium, combustible gas and atmospheric oxygen is prevented from taking place directly at the outflow edge 23 of the burn tray 10. Hence, the flame forms at a certain distance from the burn tray 10, so that there is no direct contact between the burn tray 10 and the flame and the input of heat into the burn tray 10 occurs only in the form of the radiation heat of the flame. As a result of this, the burn tray 10 may have a relatively lightweight configuration.

FIG. 4 again schematically shows the burn tray 10 according to FIG. 3. In this view, the comb plate 40 is located in a comb plate end (installed) position within the pressurized chamber 20 of the burn tray 10, i.e., the upper edge of the comb plate 40 is precisely in line with the upper edges of the baffle plate 24 of the tray 21 as well as the side wall 26 of the cover element 22, so that a defined outflow edge 23 is formed. Gaseous medium that is located in the pressurized chamber 20 can flow via the free spaces 42 through the gaps 30 in the direction of the outflow edge 23, where the gaseous medium comes into contact with the oxygen of the surrounding area. The comb plate 40 is preferably fixed in a permanent manner to the pressurized chamber 20, i.e., to the tray 21 and/or to the cover element 22. In particular, a very good fixing and sealing can be carried out by means of a welded connection. However, the comb plate 40 may instead be detachably fastened to the pressurized chamber 20. Clamping connections and snap-in connections can be used for this detachable fastening.

Figure 5:
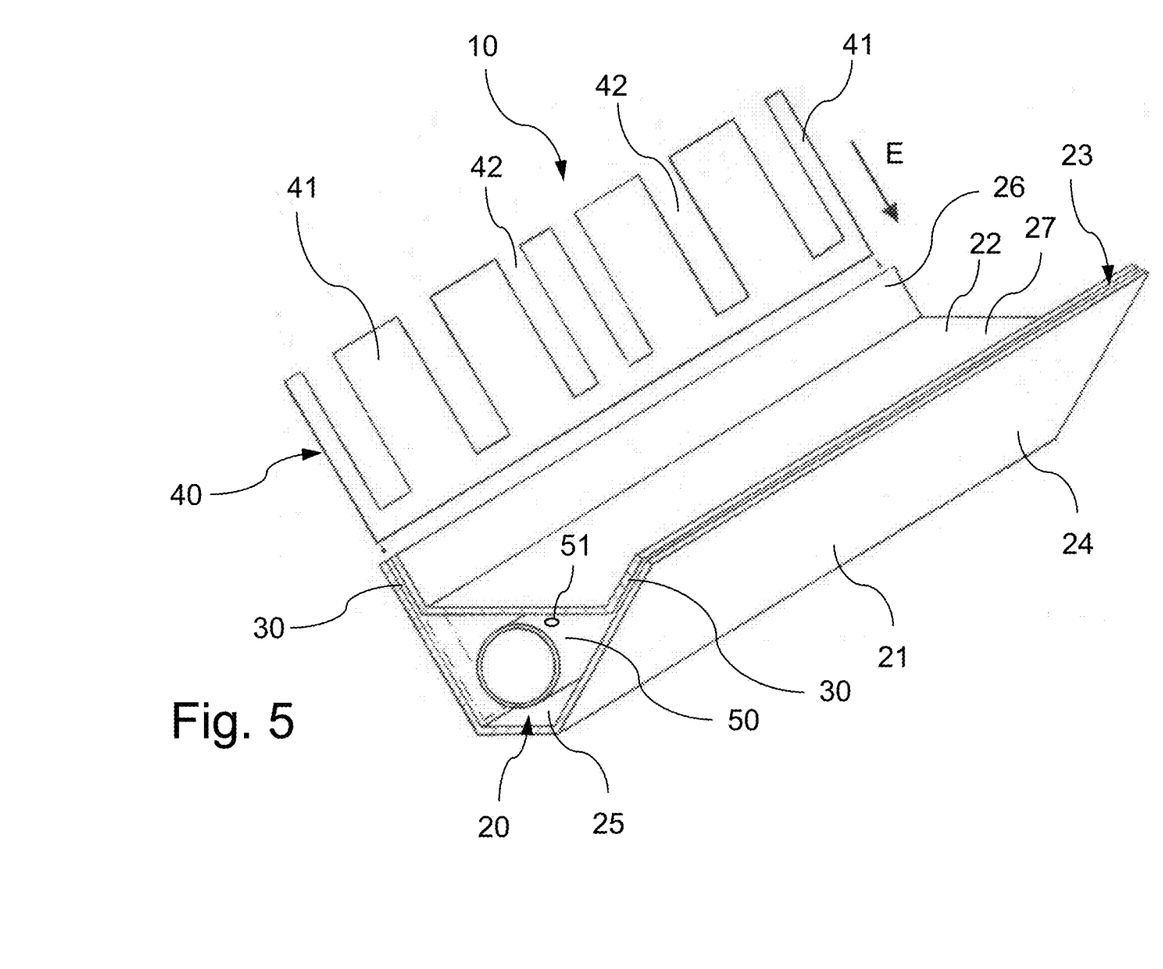
FIG. 5 is a schematic perspective view of another embodiment of a burn tray shown during the mounting of the comb plate onto the pressurized chamber.

FIG. 5 schematically shows another embodiment of a burn tray 10 in a perspective view. The burn tray 10 in this embodiment variant, in comparison to the burn tray 10 according to FIGS. 3 and 4, additionally has a gas-carrying pipeline 50. This gas-carrying pipeline 50 is arranged within the pressurized chamber 20. The gas-carrying pipeline 50 is preferably fixed, especially welded, to the tray 21 and/or to the cover element 22. The gas-carrying pipeline 50 is especially preferably arranged at the bottom 25 of the tray 21. As an alternative, the gas-carrying pipeline 50 may be arranged both spaced apart from the tray 21 and spaced apart from the cover element 22 in the pressurized chamber 20. The gas-carrying pipeline 50 is then preferably fastened on the side within the pressurized chamber 20, for example, at free areas of the baffle plates 24. The gas-carrying pipeline 50 has a plurality of holes 51. The holes may be arranged over the entire circumference of the gas-carrying pipeline 50 distributed in same. The holes 51 in the gas-carrying pipeline 50, which are directed towards the bottom 25 of the tray 21, have the advantage that gaseous medium being released through them is deflected at the bottom 25, in order to thus achieve an optimal distribution of the gaseous medium in the pressurized chamber 20. Gaseous medium flowing into the gas-carrying pipeline 50 may enter the pressurized chamber 20 via the holes 51. The gaseous medium entering the pressurized chamber 20 is deflected at the cover bottom 27 of the cover element 22, at the baffle plates 24 of the tray 21, and at the bottom 25 of the tray 21, so that optimal mixing of the gaseous medium takes place within the pressurized chamber 20. As already explained concerning FIG. 4, the gaseous medium can flow out from the pressurized chamber 20 via the free spaces 42 formed in the comb plates 40 in order to form an ignitable mixture with oxygen. The gas-carrying pipeline 50 is preferably arranged axially parallel to the longitudinal axis of the pressurized chamber 20 within the pressurized chamber 20.

Figure 6:
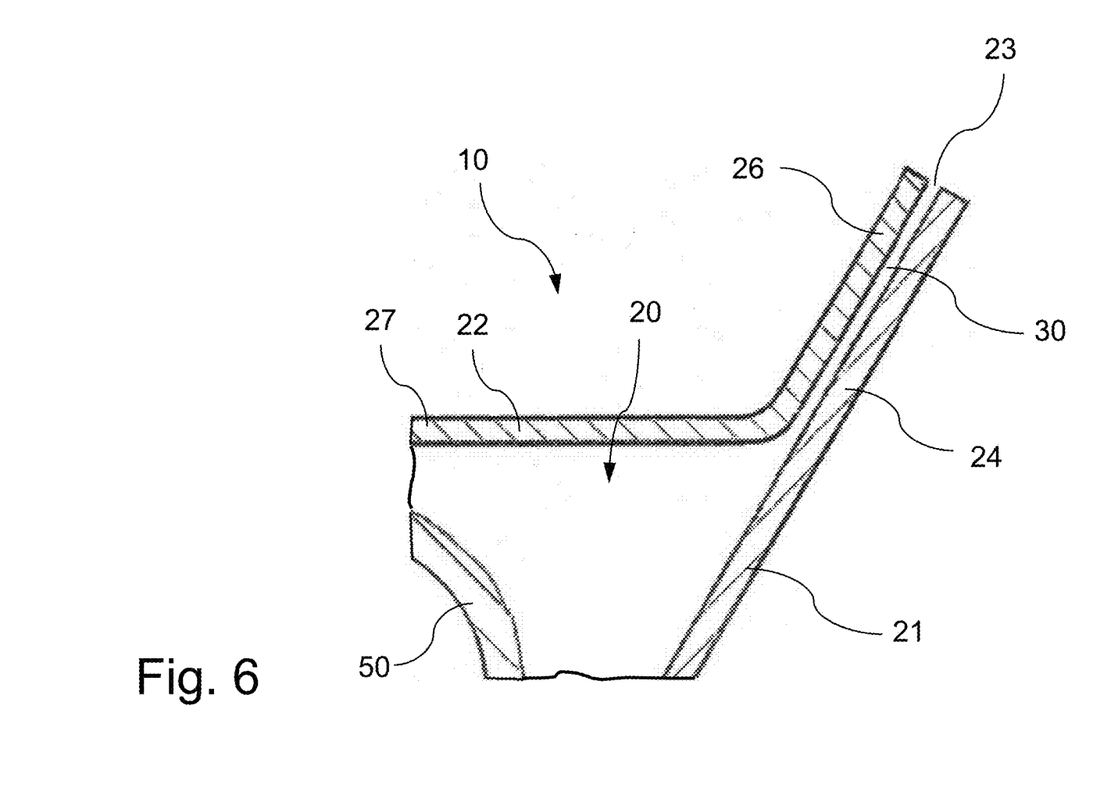
FIG. 6 is a schematic sectional view through a part of the pressurized chamber of the burn tray according to FIG. 5.
Figure 7:
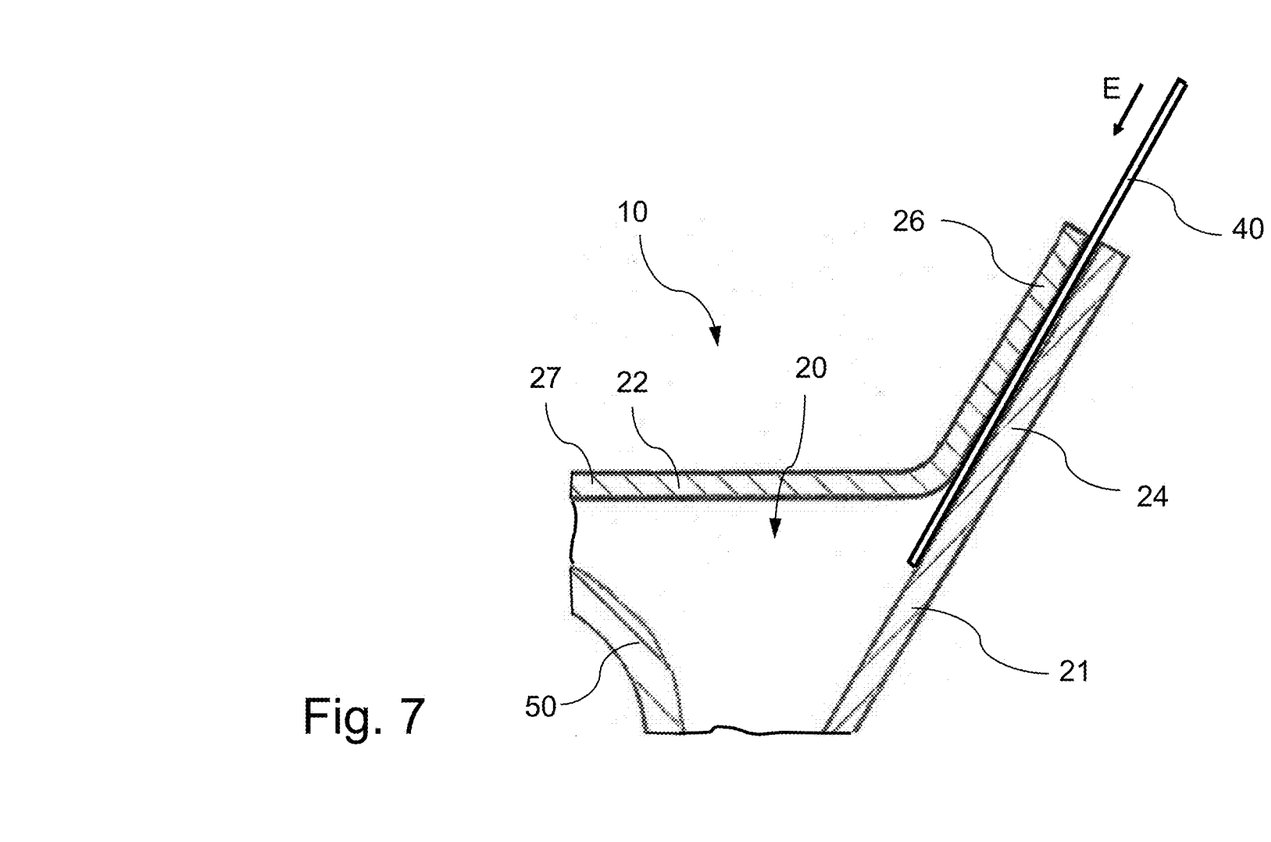
FIG. 7 is a schematic sectional view through a part of the pressurized chamber of the burn tray according to FIG. 6 with and showing the mounting of the comb plate onto the pressurized chamber.
Figure 8:
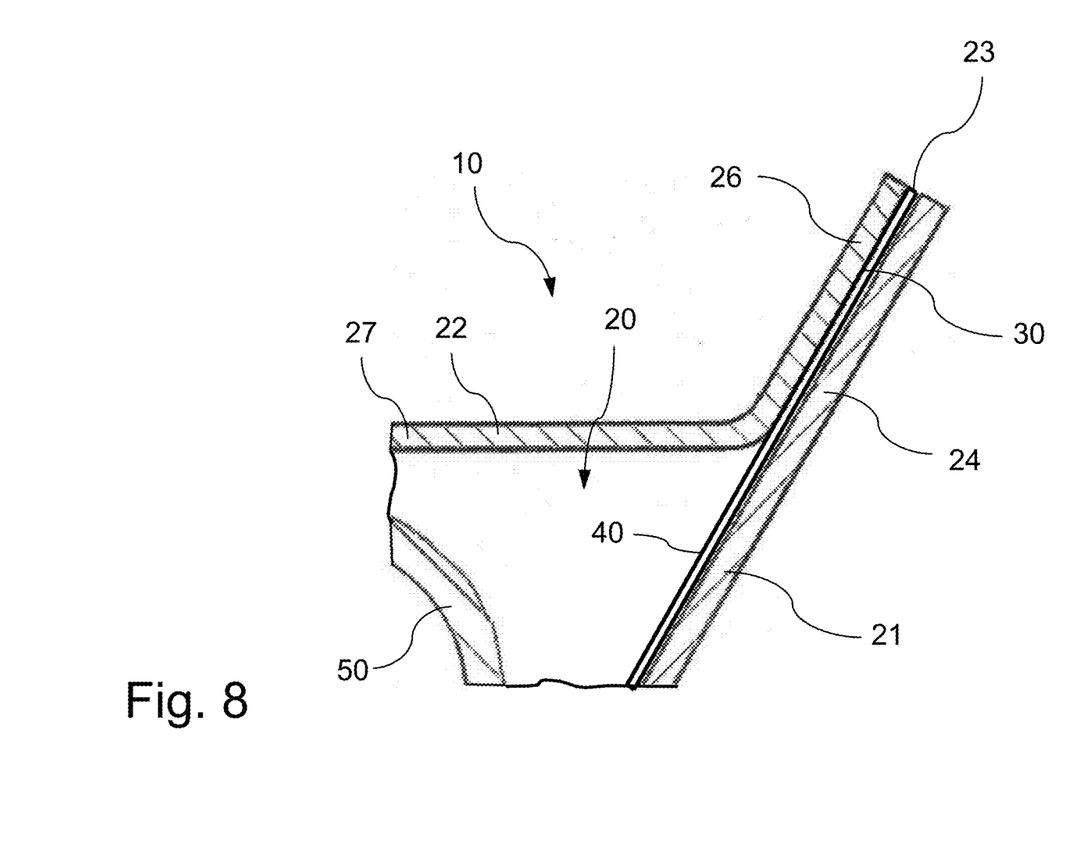
FIG. 8 is a schematic sectional view through a part of the pressurized chamber of the burn tray according to FIG. 6 with the comb plate fixed to the pressurized chamber.

FIG. 6 shows in a schematic view a section through a partial area of a pressurized chamber 20 of a burn tray 10, as shown in FIG. 5. A baffle plate 24 of the tray 21, a part of the cover bottom 27 of the cover element 22 as well as a side wall 26 of the cover element 22 can be seen. The side wall 26 of the cover element 22 is arranged parallel to and spaced apart from the baffle plate 24 of the tray 21. The provided intermediate space forms the gap 30 of the burn tray 10. Depending on the requirement of flame formation, a special comb plate 40 is inserted into this gap 30, which is shown in FIG. 7. The comb plate 40 is inserted in a precisely fitting and sealing manner into the gap 30 in the insertion direction E. FIG. 8 shows the end (installed) position of the comb plate 40 at the pressurized chamber 20. The free end of the comb plate 40 is lined up precisely with the free end of the side wall 26 of the cover element 22 as well as with the free end of the baffle plate 24 of the tray 21. In the area of the free spaces 42 of the comb plate, an outflow edge 23 is formed in the area, in which the comb plate 40, the side wall 26 as well as the baffle plate 24 line up precisely. In the position, shown in FIG. 8, of the comb plate 40 in relation to the pressurized chamber 20, the comb plate 40 is fastened permanently to the pressurized chamber 20, especially by means of a welded connection. Each web 41 of the comb plate 40 is preferably welded to the pressurized chamber 20, especially to the side wall 26 of the cover element 22 and/or to the baffle plate 24 of the tray 21. Due to the precisely fitting arrangement of the comb plate 40 within the gap 30, it is guaranteed that the comb plate 40 is arranged in a sealing manner in relation to the pressurized chamber 20. Gaseous medium may emerge from the pressurized chamber 20 only in the area of the free spaces 42 of the comb plate 40.

Figure 9:
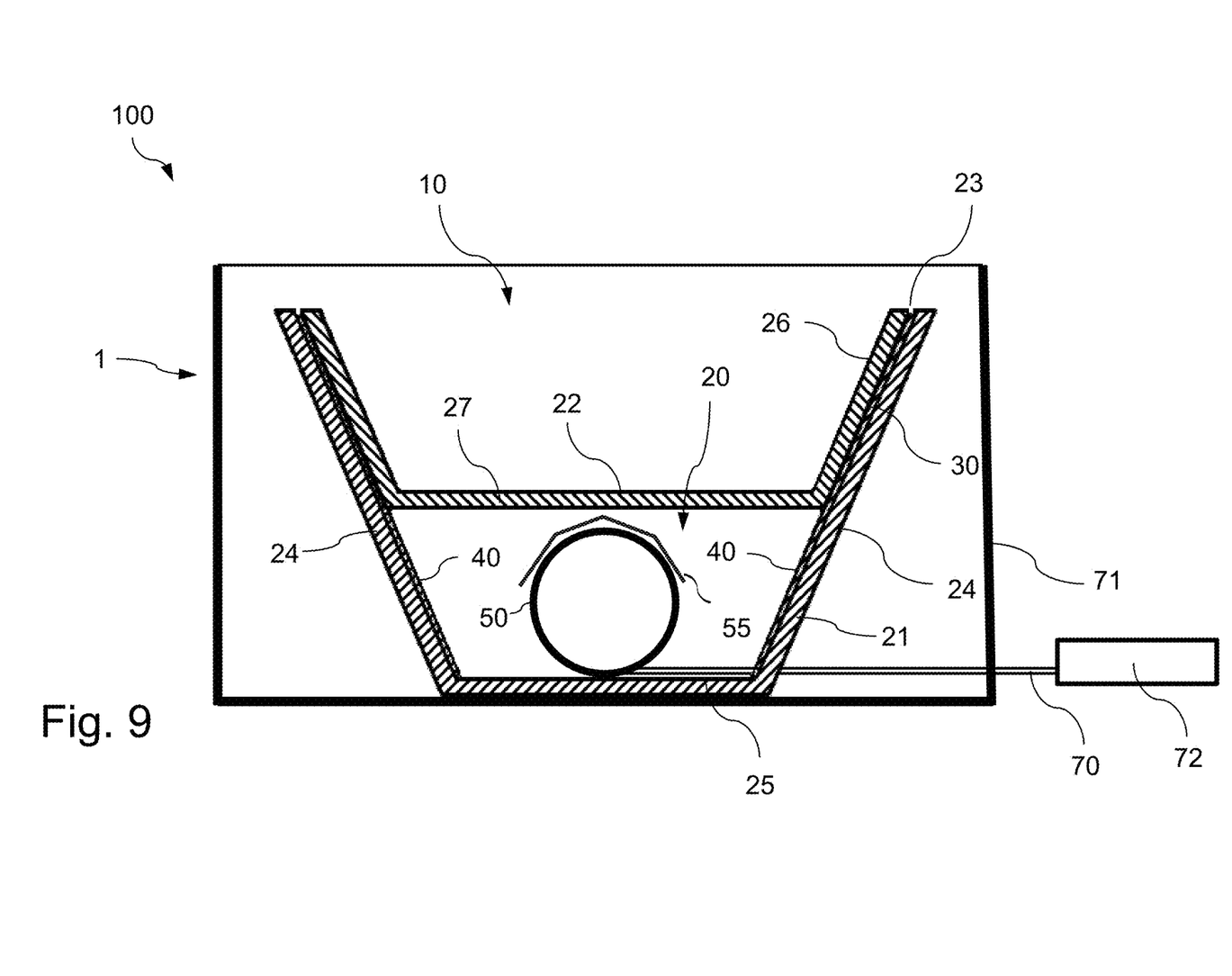
FIG. 9 is a schematic sectional view through the fire simulation system with a burner and with a burn tray according to the present invention.

FIG. 9 schematically shows in a sectional view a fire simulation system 100 with a burner 1 for simulated flames. The burner 1 has a burn tray 10. The burn tray 10 is configured according to the burn tray 10 from FIG. 5. The tray 21 as well as the cover element 22 have each a trapezoidal cross section. The burn tray 10 is arranged within a burner frame 71, which is not absolutely mandatory. Gaseous medium can be led to the gas-carrying pipeline 50 via the supply tank 72 and the feed line 70. The gaseous medium fed in can be released via holes 51 (not shown) in the gas-carrying pipeline 50 into the pressurized chamber 20 and be uniformly distributed there due to deflection at the enclosing walls and plates. A gas flow control means 55 is provided for varying the diameter of the gas-carrying pipeline and/or for varying the opening of the holes 51. The gas flow control means 55 may comprise slides to vary the gas flow quantity through the holes 51 as well as vary the rate of flow through the holes 51. For this, the gas flow control means 55 comprises a second (slide) pipe arranged about the pipeline 50. The slide of the may cover all or some of the holes 51, such that a shifting of this second pipe of the gas flow control means 55 along the axis of the pipeline 50 in an axially parallel manner, results in the holes 51 being more or less be covered, so that the outflow quantity as well as the rate of outflow of the gaseous medium can be affected by the holes 51 in cooperation with the gas flow control means 55. The gaseous medium is released from the burn tray 10 on the outflow edges 23 of the burn tray 10 and mixes with atmospheric oxygen of the surrounding area.

The embodiments of the burn tray 10 according to the present invention and the burner 1 according to the present invention shown in FIGS. 3 through 9 are very robust and at the same time have the lightest weight possible. Due to the special configuration of the burn tray 10, it is guaranteed that the flames of the ignited mixture of gaseous medium being released and atmospheric oxygen form above the burn tray 10, so that an input of heat into the burn tray 10 takes place only in the form of the radiation heat of the flame formed. A water bath for the release of the gaseous medium is not necessary, as a result of which weight can be saved.

While specific embodiments of the invention have been shown and described in detail to illustrate the application of the principles of the invention, it will be understood that the invention may be embodied otherwise without departing from such principles.

APPENDIX

List of reference designations

| | |
|---|---|
| 1 | Burner |
| 10 | Burn tray |
| 20 | Pressurized chamber |
| 21 | Tray |
| 22 | Cover element |
| 23 | Outflow edge |
| 24 | Baffle plate of the tray |
| 25 | Bottom of the tray |
| 26 | Side wall of the cover element |
| 27 | Cover bottom of the cover element |
| 30 | Gap |
| 40 | Comb plate |
| 41 | Web |
| 42 | Free space |
| 50 | Gas-carrying pipeline |
| 51 | Hole |
| 60 | Ignitable mixture |
| 61 | Gas molecules |
| 62 | Water line |
| 63 | Water |
| 70 | Feed line |
| 71 | Burner frame |
| 72 | Supply tank |
| 100 | Fire simulation system |
| 101 | Burner |
| 110 | Burn tray |
| 150 | Gas-carrying pipeline |
| 151 | Hole |
| 160 | Ignitable mixture |
| 161 | Gas molecules |
| 162 | Water line |
| 163 | Water |
| E | Insertion direction |

What is claimed is:

1. A burn tray for a burner for simulated flames in a fire simulation system, the burn tray comprising:
a tray and a cover element providing a pressurized chamber, wherein the tray and the cover element are arranged fixed to one another forming at least one gap;
at least one comb plate arranged in the at least one gap, wherein the comb plate comprises webs and free spaces.

2. A burn tray in accordance with claim 1, wherein the comb plate is fastened to the tray or is fastened to the cover element or is fastened to both the tray and the cover element in the region of the pressurized chamber.

3. A burn tray in accordance with claim 1, wherein the comb plate is welded to the tray or is welded to the cover element or is welded to both the tray and the cover element in the region of the pressurized chamber.

4. A burn tray in accordance with claim 1, wherein:
the tray comprises a bottom and baffle plates; and
the baffle plates are each arranged bent at an angle on both longitudinal sides of the bottom.

5. A burn tray in accordance with claim 1, wherein:
the cover element comprises a cover bottom and side walls; and
the side walls are each arranged bent at an angle on both longitudinal sides of the cover bottom.

6. A burn tray in accordance with claim 1, wherein:
the tray comprises a bottom and baffle plates;

the baffle plates are each arranged bent at an angle on both longitudinal sides of the bottom;

the cover element comprises a cover bottom and side walls;

the side walls are each arranged bent at an angle on both longitudinal sides of the cover bottom; and the side walls of the cover element run parallel to and spaced apart from the respective baffle plates of the tray and to form the at least one gap and another gap respectively.

7. A burn tray in accordance with claim 1, wherein the webs or the free spaces or both the webs and the free spaces of the comb plate have different widths.

8. A burn tray in accordance with claim 1, further comprising a gas-carrying pipeline arranged in the pressurized chamber, the gas-carrying pipeline having holes for passage of a gaseous medium flowing through the gas-carrying pipeline into the pressurized chamber.

9. A burn tray in accordance with claim 6, wherein the side walls of the cover element cooperate with the baffle plates to form outflow edges and the outflow edges in cooperation with the free spaces of the comb plates provide a defined outflow of the gaseous medium from the pressurized chamber.

10. A burn tray in accordance with claim 1, wherein the comb plate lines up with the side walls of the cover element and with the baffle plates of the tray.

11. A burn tray in accordance with claim 8, further comprising gas flow control means for varying an operative flow dimension of the holes of the gas-carrying pipeline.

12. A burner for simulated flames in a fire simulation system, the burner comprising:
at least one burn tray comprising a tray and a cover element providing a pressurized chamber, wherein the tray and the cover element are arranged fixed to one another forming at least one gap and at least one comb plate arranged in the at least one gap, wherein the comb plate comprises webs and free spaces; and
at least one feed line feeding gaseous medium into the pressurized chamber.

13. A burner in accordance with claim 12, further comprising a burner frame for accommodating the at least one burn tray.

14. A burner in accordance with claim 13, wherein:
the burn tray further comprises a gas-carrying pipeline arranged in the pressurized chamber;
the gas-carrying pipeline has openings for passage of a gaseous medium flowing through the gas-carrying pipeline into the pressurized chamber; and
the at least one feed line feeds the gaseous medium into the pressurized chamber via the gas-carrying pipeline.

15. A burner in accordance with claim 14, wherein:
the tray comprises a bottom and baffle plates;
the baffle plates are each arranged bent at an angle on both longitudinal sides of the bottom;
the cover element comprises a cover bottom and side walls;
the side walls are each arranged bent at an angle on both longitudinal sides of the cover bottom;
the side walls of the cover element run parallel to and spaced apart from the respective baffle plates of the tray and to form the at least one gap and another gap respectively.

16. A burner in accordance with claim 15, wherein the side walls of the cover element cooperate with the baffle plates to form outflow edges and the outflow edges in cooperation with the free spaces of the comb plates provide a defined outflow of the gaseous medium from the pressurized chamber.

17. A fire simulation system comprising:
a burner comprising at least one burn tray comprising a tray and a cover element providing a pressurized chamber, wherein the tray and the cover element are arranged fixed to one another forming at least one gap and at least one comb plate arranged in the at least one gap, wherein the comb plate comprises webs and free spaces and at least one feed line feeding gaseous medium into the pressurized chamber; and
a supply tank supplying gaseous medium to the pressurized chamber.

18. A fire simulation system in accordance with claim 17, further comprising another burner comprising at least one burn tray comprising a tray and a cover element providing a pressurized chamber, wherein the tray and the cover element are arranged fixed to one another forming at least one gap and at least one comb plate arranged in the at least one gap, wherein the comb plate comprises webs and free spaces and at least one feed line for a feed of gaseous medium into the pressurized chamber or into a gas-carrying pipeline of the burn tray to provide a plurality of burners arranged next to each other at a defined distance from one another.

19. A fire simulation system in accordance with claim 17, wherein:
the burn tray further comprises a gas-carrying pipeline arranged in the pressurized chamber;
the gas-carrying pipeline has openings for passage of a gaseous medium flowing through the gas-carrying pipeline into the pressurized chamber; and
the at least one feed line feeds the gaseous medium into the pressurized chamber via the gas-carrying pipeline.

20. A fire simulation system in accordance with claim 19, wherein:
the tray comprises a bottom and baffle plates;
the baffle plates are each arranged bent at an angle on both longitudinal sides of the bottom;
the cover element comprises a cover bottom and side walls;
the side walls are each arranged bent at an angle on both longitudinal sides of the cover bottom;
the side walls of the cover element run parallel to and spaced apart from the respective baffle plates of the tray and to form the at least one gap and another gap respectively.

* * * * *